United States Patent [19]

Hazelton et al.

[11] Patent Number: 4,925,214

[45] Date of Patent: May 15, 1990

[54] COUNT DOWN SYSTEM FOR RECORDING CHARTS

[75] Inventors: Donald R. Hazelton, Chester, N.H.; Paul J. Latka, West Springfield, Mass.; Joseph N. Lyons, Jr., Springfield, Mass.; Eugene H. Spender, Jr., North Billerica, Mass.

[73] Assignee: Hewlett-Packard Company, Palo Alto, Calif.

[21] Appl. No.: 60,130

[22] Filed: Jun. 9, 1987

[51] Int. Cl.[5] .......................... B42D 15/00; B42D 19/00; G03B 1/04; G11B 15/06

[52] U.S. Cl. .......................... 283/62; 283/900; 242/71.2; 242/188

[58] Field of Search .......................... 283/61, 62, 66 A; 40/359, 360; 346/734; 235/2, 58 R; 428/121; 33/331; 242/71.1, 71.2, 57, 59, 186, 188

[56] References Cited

U.S. PATENT DOCUMENTS

| | | | |
|---|---|---|---|
| 2,077,242 | 4/1937 | Pierre | 283/62 |
| 2,124,906 | 7/1938 | Bryce | 283/62 |
| 3,138,081 | 6/1964 | Nerwin | 242/71.2 |
| 3,302,309 | 4/1967 | Macomber | 283/62 |
| 3,556,564 | 1/1971 | Aldinger | 283/62 |
| 4,467,207 | 8/1984 | Lerner | 283/62 |
| 4,477,103 | 10/1984 | Bertolazzi | 283/62 |
| 4,492,993 | 1/1985 | Otis | 242/188 |

*Primary Examiner*—Paul A. Bell
*Assistant Examiner*—Paul M. Heyrana, Sr.
*Attorney, Agent, or Firm*—Frank R. Perillo

[57] ABSTRACT

Signs or indicia are printed or otherwise formed at locations on the last portion of a recording strip that indicate the amount of recording that can occur after each location. The indication can be in the number of pages, length of paper or time.

3 Claims, 1 Drawing Sheet

COUNT DOWN SYSTEM FOR RECORDING CHARTS

BACKGROUND OF THE INVENTION

Strips of paper in rolls or in packages of Z fold paper are generally available for use with recorders. A warning strip has been printed along the last portion of the roll or package so as to indicate to the operator that the end of recording area is approaching, but it is very easy for the paper to reach the end of its recording area before it is replaced In some situations this can lead to a loss of data that may endanger the life of a patient to whom this data relates, and in other situations the data lost may be essential to manufacturing procedures.

BRIEF SUMMARY OF THE INVENTION

In accordance with this invention signs are respectively formed at a plurality of successive locations along the last portion of the strip that respectively indicate the amount of recording, measured in time, length of paper or number of pages between the location and the end of the recording area of the strip. If the strip is to be advanced page by page, the number of remaining recording pages can be printed or otherwise respectively formed on each of several last pages Thus, for example, the number 5 along with "pages to the end" or "unit areas to the end" may be printed on the sixth page from the end.

If the operator will know the paper speed, "pages to the end" or "unit areas to the end" may be converted to time. This can be done regardless of whether the paper is in the form of a roll or in the form of a package of Z fold pages and regardless of whether the recording is along the strip or transverse to it.

DETAILED DESCRIPTION OF THE INVENTION

Figure 1:
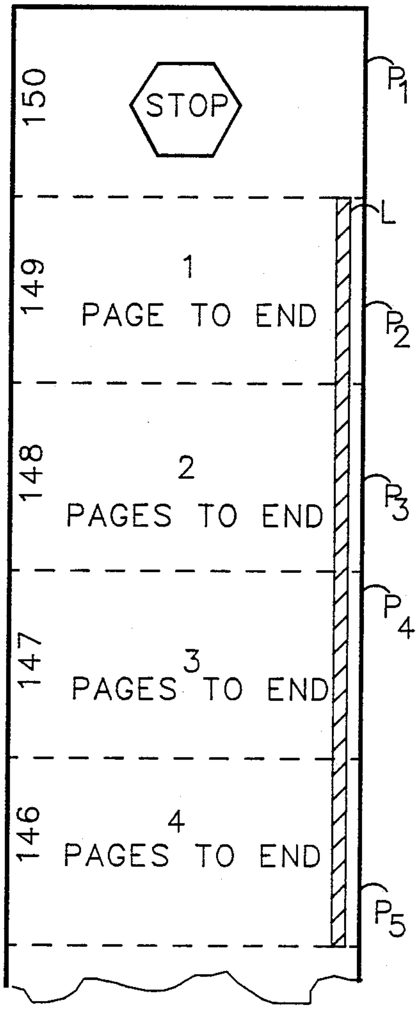
FIG. 1 illustrates a strip of recording paper in which the number of remaining pages of recording area is printed on each page.

FIG. 1 illustrates an embodiment of the invention in which the recording strip is in the form of Z fold paper having pages $P_1$–$P_5$ respectively lying between folds that are indicated by the dashed lines. One former way of indicating that the end of the strip is being approached was to print a colored line L on several of the last pages that is parallel to the length of the strip. Although the colored line L can be seen as the strip emerges from the recorder, the amount of the strip that is available for recording is not readily apparent, especially in view of the fact that there is no industry standard as to how many pages the line is printed on. If the line is visible for a long time, it ceases to be an effective warning.

In some cases each page bears its own number in ascending chronological order, so that the data thereon can be identified. Whereas this may make it possible for an operator to know how much of the strip is left, such an ascending chronological numbering system requires knowledge of the specific numbering system being used, and also the need for making mental calculations.

In accordance with this invention signs or indicia may be printed on the last pages of the strip indicating the number of pages remaining. Thus "4 pages to the end" may be printed on the fifth page, $P_5$, from the end, "3 pages from the end" may be printed as the fourth page, $P_4$, etc. In this way the strip effectively communicates with the operator.

Figure 2:
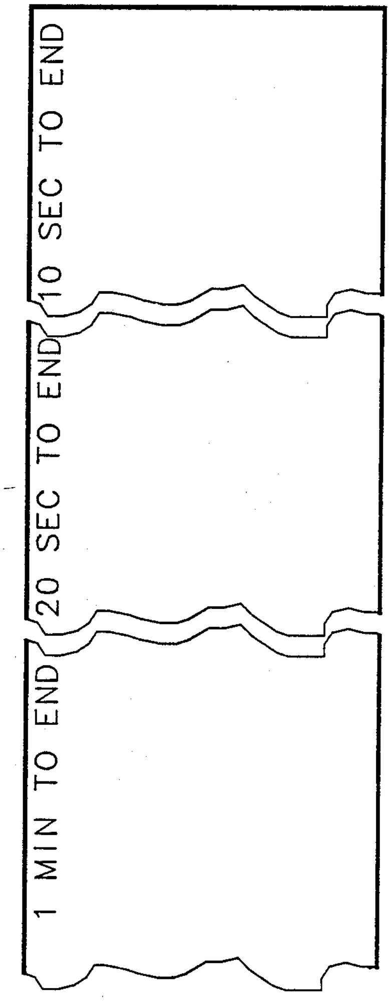
FIG. 2 illustrates a strip of recording paper in which the time remaining until the end of the paper will be reached is printed at appropriate locations.

Another form of strip that communicates with the operator is illustrated in FIG. 2. If it is in the form of a roll and it is assumed that the speed of advance is known. In this case, the indicia formed on the strip may be in the form of "1 minute to go", "20 minutes to go" and "ten seconds to go" that are printed at appropriate locations on the strip. This method could also be used with the Z fold strip shown in FIG. 1.

The last page of the strip shown in FIG. 1 has the word "STOP" printed thereon. In one prior art recorder it is arranged that this page be permitted to hang from the recorder after recording has ceased, but by then it is too late. Whereas some forewarning may be provided as the word "STOP" begins to emerge from the recorder, it must be remembered that operators generally view the recorder during the making of rounds so that the strip of a particular recorder may be seen at intervals. Thus, if the time between the very first appearance of the word "STOP" and the time when the recorder is shut off is less than the interval referred to, no adequate forewarning that the recorder is about to run out of paper is made. On the other hand, if the forewarning is made over too long a time, as would be the case where the colored line L is printed on the last third of a strip, it is not effective.

It is submitted that the formation of signs giving positive information as to the amount of recording remaining, whether it be length of the strip, number of pages or time gives an effective warning to an operator. It is only necessary that the signs occur for a time greater than the intervals between rounds.

We claim:

1. Paper for use in a recorder comprising:

a strip of paper adapted to be moved along its length during a recording process, said strip having a first predetermined length and a second predetermined length, said second length of said strip being adapted to be recorded upon, said second length being shorter than said first length; discrete signs formed at a plurality of successive locations along said strip, said signs being formed only within the last portion of said second length, said signs directly indicating the length of said strip remaining between the location of each said sign and the end of said second length.

2. Paper as in claim 1 wherein said strip is divided into a plutality of pages each page having a predetermined length, and wherein said signs indicate the number of pages remaining between the location of each said sign and the end of said second length.

3. Paper as in claim 1 wherein said strip is intended to be moved through a recorder at a predetermined speed and wherein said signs indicate the amount of time required to move said strip from the location of each said sign to the end of said second length at said predetermined speed.

* * * * *